US007066668B2

(12) United States Patent
Sandison et al.

(10) Patent No.: US 7,066,668 B2
(45) Date of Patent: Jun. 27, 2006

(54) METHOD OF CREATING AN IMAGE REPLACEMENT DOCUMENT FOR USE IN A CHECK TRUNCATION ENVIRONMENT AND AN APPARATUS THEREFOR

(75) Inventors: Judith I. Sandison, Waterloo (CA); Wayne M. Doran, Kitchener (CA)

(73) Assignee: NCR Corporation, Dayton, OH (US)

( * ) Notice: Subject to any disclaimer, the term of this patent is extended or adjusted under 35 U.S.C. 154(b) by 121 days.

(21) Appl. No.: 10/732,651

(22) Filed: Dec. 10, 2003

(65) Prior Publication Data
US 2005/0129300 A1 Jun. 16, 2005

(51) Int. Cl.
*B41J 13/00* (2006.01)
*G06K 9/00* (2006.01)

(52) U.S. Cl. ...................... 400/578; 382/137
(58) Field of Classification Search ................ 400/578; 382/137; 235/379, 380; 705/78, 42, 30; 399/232
See application file for complete search history.

(56) References Cited

U.S. PATENT DOCUMENTS

| | | | | |
|---|---|---|---|---|
| 4,672,377 A | * | 6/1987 | Murphy et al. ............ 340/5.41 |
| 4,901,114 A | * | 2/1990 | Parker et al. ............... 399/232 |
| 5,036,362 A | * | 7/1991 | Stelter ........................ 399/231 |
| 5,193,121 A | * | 3/1993 | Elischer et al. ............. 382/138 |
| 5,371,798 A | * | 12/1994 | McWhortor .................. 380/51 |
| 5,590,196 A | * | 12/1996 | Moreau ........................ 705/78 |
| 5,652,802 A | * | 7/1997 | Graves et al. ............... 382/135 |
| 5,689,578 A | * | 11/1997 | Yamauchi et al. .......... 385/123 |
| 5,801,366 A | * | 9/1998 | Funk et al. .................. 235/380 |
| 6,290,129 B1 | * | 9/2001 | Momose ....................... 235/449 |
| 6,764,015 B1 | * | 7/2004 | Pearson ....................... 235/487 |
| 6,860,423 B1 | * | 3/2005 | Kallin ........................ 235/380 |
| 2001/0045452 A1 | * | 11/2001 | Momose et al. ............. 235/379 |
| 2002/0154807 A1 | * | 10/2002 | Jones et al. ................. 382/135 |
| 2003/0202690 A1 | * | 10/2003 | Jones et al. ................. 382/139 |
| 2003/0219122 A1 | * | 11/2003 | Ramirez et al. .............. 380/54 |
| 2004/0213616 A1 | * | 10/2004 | Chiu ............................ 400/76 |
| 2005/0015317 A1 | * | 1/2005 | Rodriguez et al. ........... 705/30 |
| 2005/0033685 A1 | * | 2/2005 | Reyes ........................... 705/39 |
| 2005/0097050 A1 | * | 5/2005 | Orcutt .......................... 705/45 |

OTHER PUBLICATIONS

American National Standards Institute, X9.100-140 Specifications for an Image Document—IRD, 2004.*

(Continued)

*Primary Examiner*—Ren Yan
*Assistant Examiner*—Wasseem H. Hamdan
(74) *Attorney, Agent, or Firm*—Michael Chan

(57) ABSTRACT

An image replacement document (IRD) is created in a single feed of sheet of material through a feeder. A print file having a MICR portion and a non-MICR portion is built based upon IRD data. The IRD data used to build the print file may be from an external application. At least some information is printed with magnetic ink onto a first portion of the sheet of material based upon the MICR portion of the print file. At least some information is printed with non-magnetic ink onto a second portion of the sheet of material based upon the non-MICR portion of the print file. The first portion of the sheet of material and the second portion of the sheet of material are on the front side of the IRD. Also, at least some information may be printed with non-magnetic ink onto a third portion of the sheet of material based upon the non-MICR portion of the print file. The third portion of the sheet of material is on the back side of the IRD.

4 Claims, 9 Drawing Sheets

OTHER PUBLICATIONS

Bill Lange, Combining Remote Capture and IRD Printing, First Edition Aug. 2005.*

The Federal Reserve Board, Consumer Guide to Check 21 and Substitute Checks, last update, Feb. 16, 2004.*

The Federal Reserve Board, Anatomy of a substitute check, 2004.*

Susan Kraus, Checks 21 Compliant Checks and Image File Size Requirements, Mar. 7, 2005.*

* cited by examiner

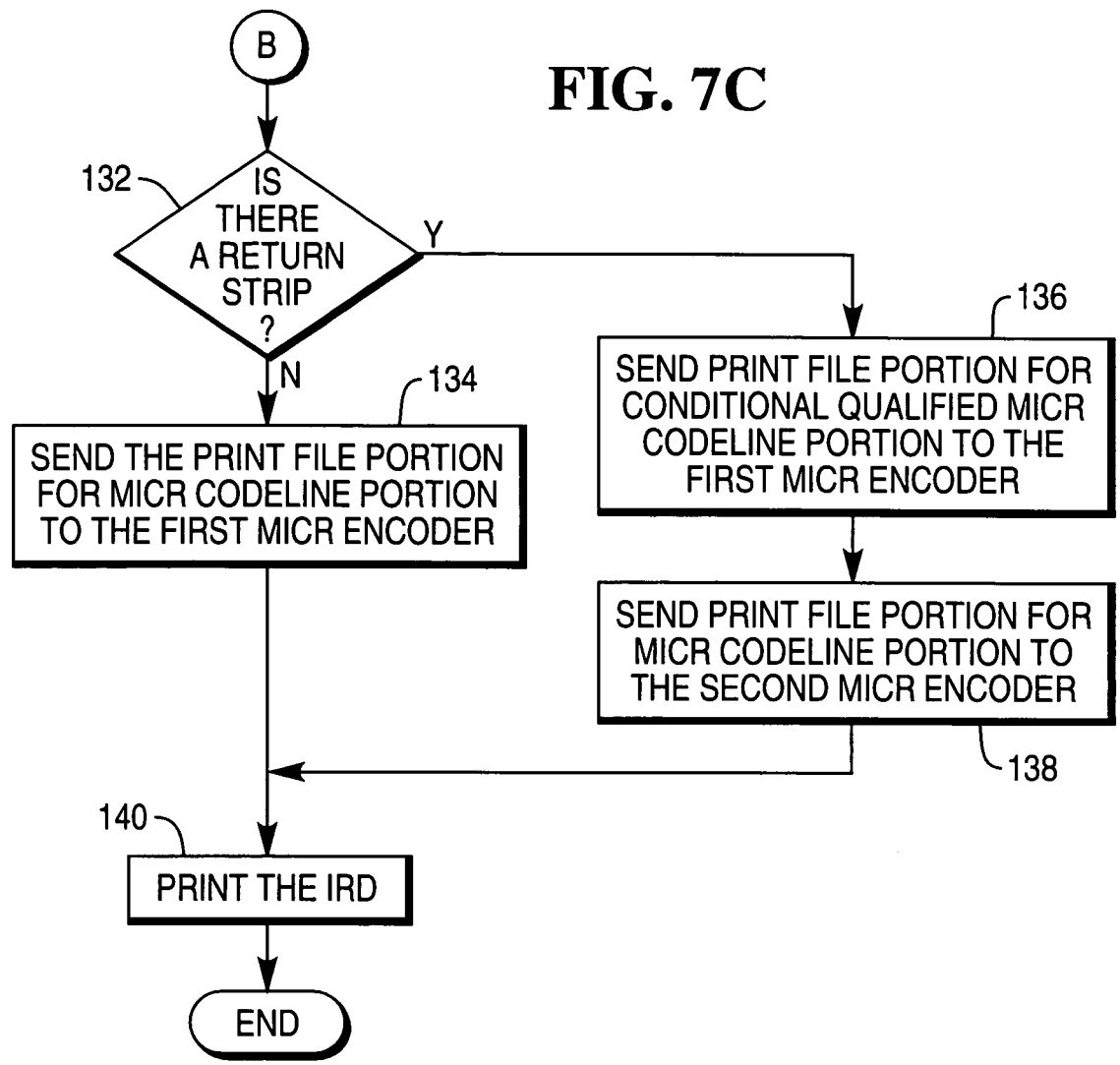

METHOD OF CREATING AN IMAGE REPLACEMENT DOCUMENT FOR USE IN A CHECK TRUNCATION ENVIRONMENT AND AN APPARATUS THEREFOR

BACKGROUND OF THE INVENTION

The present invention relates to image replacement documents, and is particularly directed to a method of creating an image replacement document for use in a check truncation environment and an apparatus therefor.

In a check truncation environment, an original check is not transferred between banks during the check clearing process. Instead, electronic image data which is representative of an image of an original check is transferred between the banks. When a paper version of the original check is needed, it may be printed on demand using the electronic image and related data which is representative of the original check. This paper version is called an image replacement document (IRD).

The creation of an IRD for use in a check truncation environment is defined by American National Standards Institute (ANSI) X9.90 standard. This standard defines the content of an IRD using the front and back images of an original check and data associated with the check. Currently, institutions having a need to print IRDs usually use some type of laser printer which uses ink with magnetic properties (i.e., magnetic ink). Magnetic ink is needed for printing the magnetic ink character recognition (MICR) codeline of the original check onto the IRD. In these known IRD printing applications, the entire IRD is printed with magnetic ink. Magnetic ink costs more than non-magnetic ink. Accordingly, a disadvantage in using magnetic ink to print the entire IRD is that there is a relatively higher material cost since more magnetic ink is used as compared to if only the MICR codeline of the IRD was printed with magnetic ink.

One way to reduce the amount of magnetic ink used to print an IRD is to perform two printing passes. During one printing pass, magnetic ink is used to print the MICR codeline on the IRD. During the other printing pass, non-magnetic ink is used to print all information other than the MICR codeline on the IRD. However, when a two-pass printing process is used to print an IRD, problems may result from mis-assignment of print data. Mis-assignment of print data occurs when print data corresponding to information to be printed with magnetic ink and print data corresponding to information to be printed with non-magnetic ink are not associated with the same IRD to be created. Also, there is a relatively higher labor cost when a two-pass printing process is used since additional labor is needed to accommodate the two-pass printing process. It would be desirable to be able to print an IRD with reduced labor cost as well as reduced material cost.

SUMMARY OF THE INVENTION

In accordance with one aspect of the present invention, a method of creating an image replacement document (IRD) during a single pass of sheet material through a printing apparatus comprises building a first print file portion based upon IRD data, building a second print file portion based upon IRD data, printing with magnetic ink onto the sheet material at least some information based upon the first portion of the print file to create a first portion of the IRD during the single pass of the sheet material through the printing apparatus, and printing with non-magnetic ink onto the sheet material at least some information based upon the second portion of the print file to create a second portion of the IRD during the single pass of the sheet material through the printing apparatus. The IRD data may be received from an application external to the printing apparatus.

In accordance with another aspect of the present invention, a method of creating an image replacement document (IRD) for use in a check truncation environment comprises building a print file having a MICR portion and a non-MICR portion based upon IRD data, printing with magnetic ink a first portion of the IRD based upon the MICR portion of the print file, and printing with non-magnetic ink a second portion of the IRD based upon the non-MICR portion of the print file. The first portion of the IRD and the second portion of the IRD are on the front side of the IRD. The method may further comprise printing with non-magnetic ink a third portion of the IRD based upon the non-MICR portion of the print file. The third portion of the IRD is on the back side of the IRD. The IRD data may be received from an external application.

In accordance with yet another aspect of the present invention, an apparatus is provided for printing an image replacement document (IRD) onto a single sheet of material during a single pass of the single sheet of material. The apparatus comprises a feeder for feeding the single sheet of material on which information is to be printed to provide the IRD. The apparatus further comprises means for building a print file having a MICR portion and a non-MICR portion based upon IRD data. The apparatus also comprises means for printing with magnetic ink onto a first portion of the single sheet of material at least some information based upon the MICR portion of the print file during the single pass of the single sheet of material, and means for printing with non-magnetic ink onto a second portion of the single sheet of material at least some information based upon the non-MICR portion of the print file during the single pass of the single sheet of material. The first portion of the single sheet of material and the second portion of the single sheet of material are on the front side of the IRD. The apparatus may further comprise means for printing with non-magnetic ink onto a third portion of the single sheet of material at least some information based upon the non-MICR portion of the print file during the single pass of the single sheet of material. The third portion of the single sheet of material is on the back side of the IRD. The apparatus may further comprise means for receiving IRD data from an external application.

In accordance with still another aspect of the present invention, an integrated printer apparatus is provided for printing an image replacement document (IRD). The integrated printer apparatus comprises a feeder for feeding a sheet of material on which information is to be printed to provide the IRD. The integrated printer apparatus further comprises means for building a print file having a MICR portion and a non-MICR portion based upon IRD data. The integrated printer apparatus also comprises single means for (i) printing with magnetic ink onto a first portion of the sheet of material at least some information based upon the MICR portion of the print file, and (ii) printing with non-magnetic ink onto a second portion of the sheet of material at least some information based upon the non-MICR portion of the print file during a single feed of the sheet of material through the feeder. The first portion of the sheet of material and the second portion of the sheet of material are on the front side of the IRD. The integrated printer apparatus may further comprise means for printing with non-magnetic ink onto a third portion of the sheet of material at least some information based upon the non-MICR portion of the print file. The third portion of the sheet of material is on the back side of the IRD. The integrated printer apparatus may further comprise means for receiving IRD data from an external application.

BRIEF DESCRIPTION OF THE DRAWING

The foregoing and other features of the present invention will become apparent to one skilled in the art to which the present invention relates upon consideration of the following description of the invention with reference to the accompanying drawings, wherein.

DETAILS OF THE INVENTION

The present invention is directed to method of creating an image replacement document (IRD) for use in a check truncation environment and an apparatus therefor. The specific environment in which the IRD is used may vary. In the present application, the IRD is used in a check truncation environment. In a check truncation environment, an IRD is sometimes referred to as a substitute check. The American National Standards Institute (ANSI) X9.90 standard defines the content of IRDs in a check truncation environment.

Figure 1:
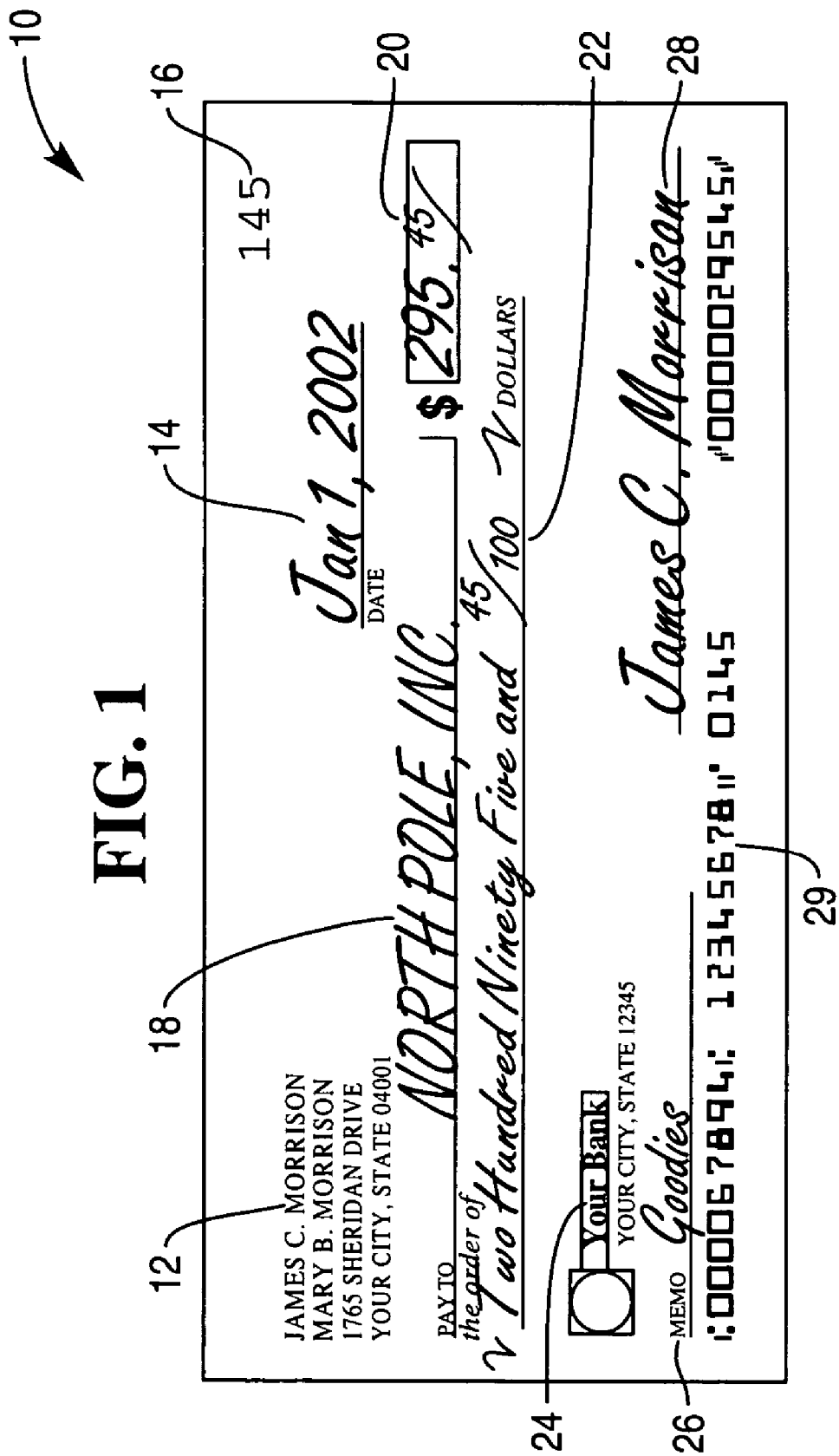
FIG. 1 is an illustration of the front side of a typical original check.

Different types of checks are processed in a check truncation environment. A physical personal check 10, as shown in FIG. 1, is one type of check which is processed. The check features shown in FIG. 1 include a payer field 12, a date field 14, a check number field 16 located in the upper-right corner of the check 10, a payee field 18, a courtesy amount field 20, a legal amount field 22, a paying bank name field 24, a memo field 26, a payer signature field 28, and a magnetic ink character recognition (MICR) codeline field 29.

Figure 2:
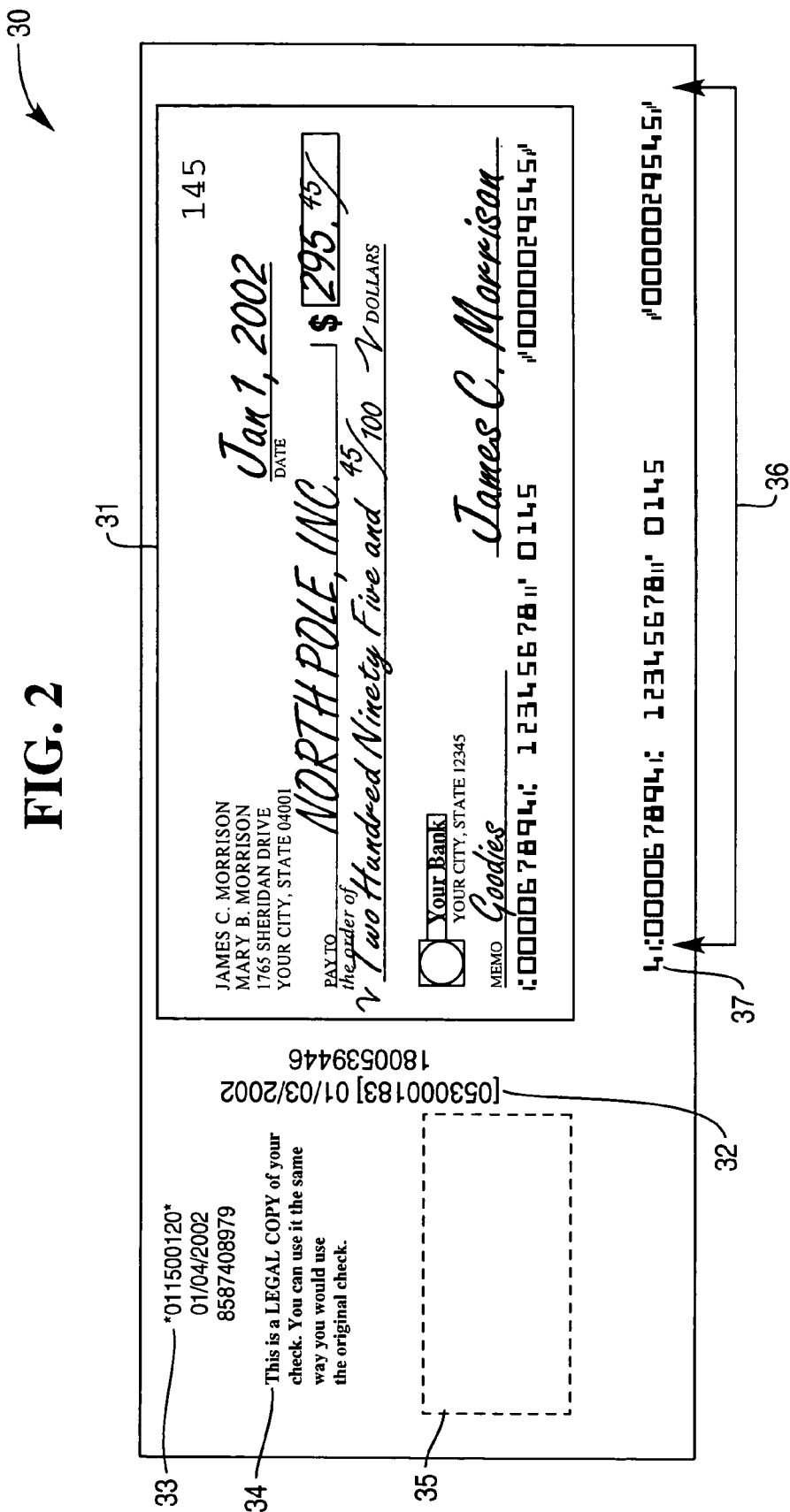
FIG. 2 is an illustration of the front side of an original image replacement document (IRD) for the original check of FIG. 1.
Figure 3:
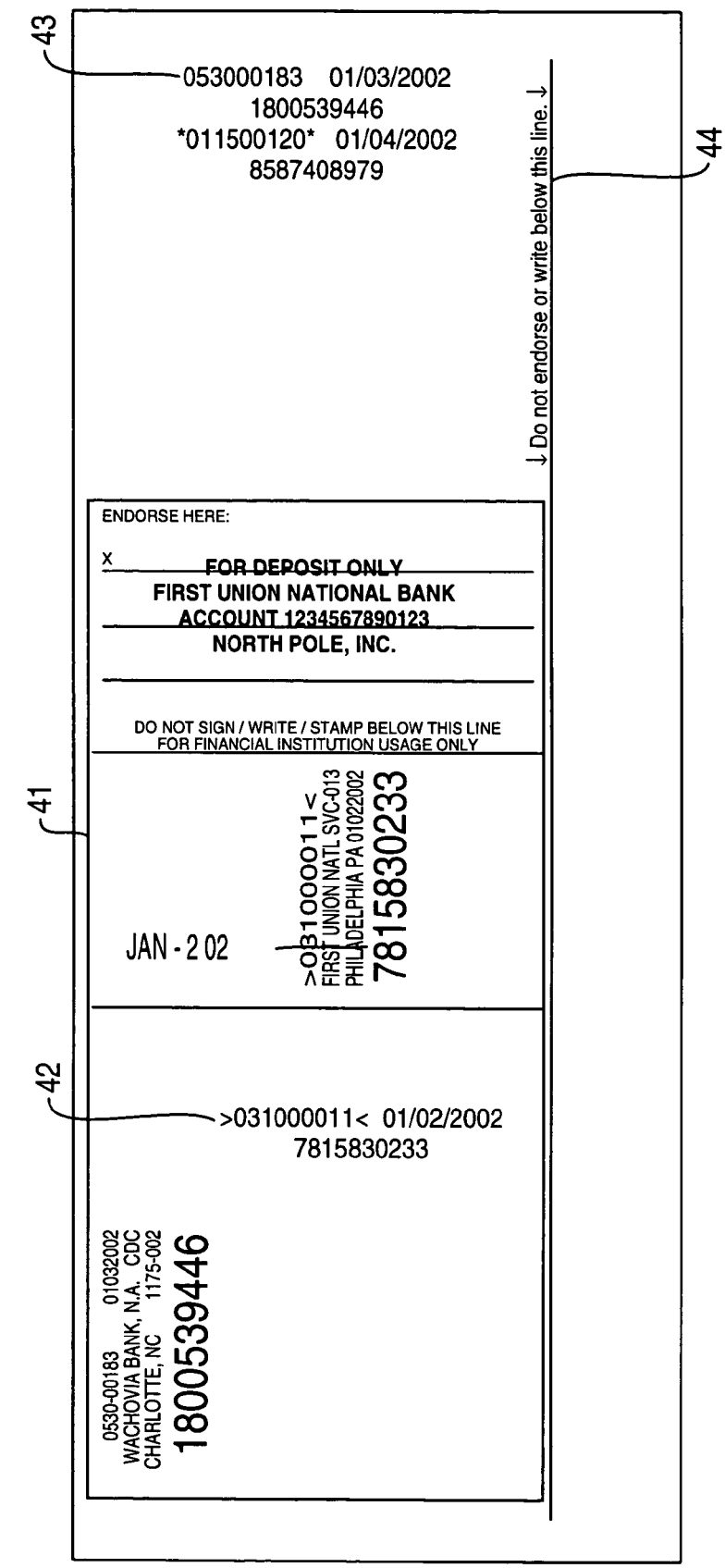
FIG. 3 is an illustration of the back side of the original IRD of FIG. 2.

Referring to FIGS. 2 and 3, the front side (FIG. 2) of an original IRD 30 of the check 10 and the backside (FIG. 3) of the original IRD are illustrated. The front side of the original IRD 30 includes an original scanned front image 31 of the check 10. The front side of the original IRD 30 also includes an endorsement 32 of the bank which captured the image of the check 10 to provide the front image 31. The bank which captured the front image 31 of the check 10 may or may not be the bank of first deposit.

The front side of the original IRD 30 further includes an endorsement 33 of the bank which created the original IRD. This endorsement 33 includes three elements which are (i) the routing transit number "011500120" associated with the original IRD 30, (ii) the date of creation of the original IRD (i.e., "Jan. 4, 2002"), and (iii) the sequence number "8587408979" associated with the original IRD. The two asterisks enclosing the routing transit number are used to indicate that this is the bank which created the original IRD 30, as defined by the ANSI X9.90 standard. The front side of the original IRD 30 also includes a text overlay 34 which identifies the original IRD as being a legal copy of the check 10. Also included is an optional information area 35, as defined by the ANSI X9.90 standard, for placing optional information.

The front side of the original IRD 30 also includes a MICR codeline 36 from the check 10 which has been encoded. This MICR codeline 36 is printed with ink which contains magnetic properties (referred to herein as "magnetic ink") and is the same as the MICR codeline contained in the front image 31 of the check 10. Also included is an IRD identification 37 adjacent to the MICR codeline 36, in the position as shown in FIG. 2. The IRD identification 37 is referred to as an "electronic processing code (EPC) digit" as defined by the ANSI X9.90 standard. The IRD identification 37 is also printed with magnetic ink.

As shown in FIG. 3, the back side of the original IRD 30 includes an original scanned back image 41 of the check 10. The back side of the original IRD 30 also includes an initial bank of first deposit (BOFD) endorsement overlay 42. An overlay 43 of any subsequent endorsements, and a line/text overlay 44 which requests that no writings be made below the line are also included.

Figure 4:
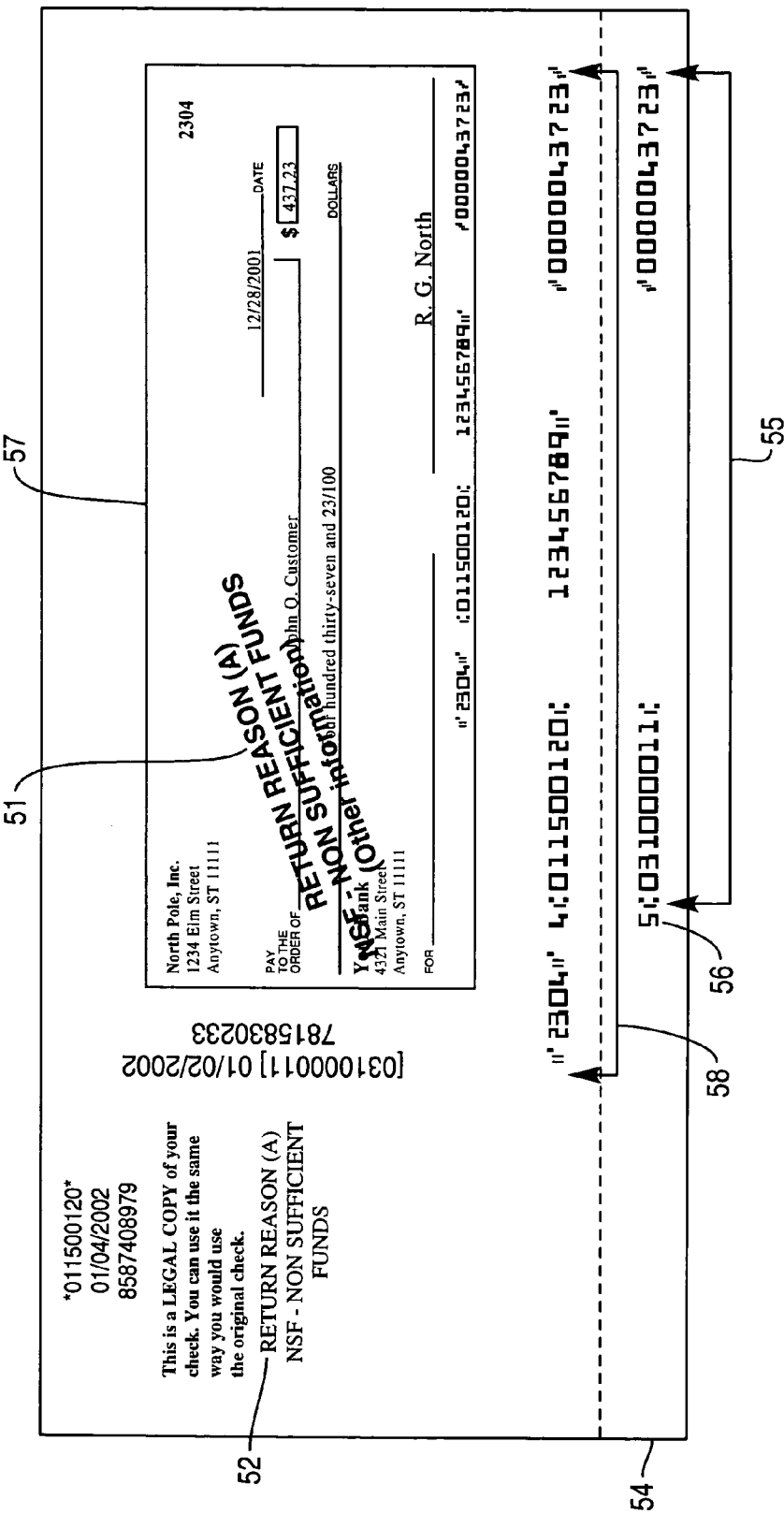
FIG. 4 is an illustration of the front side of another original IRD for another original check.
Figure 5:
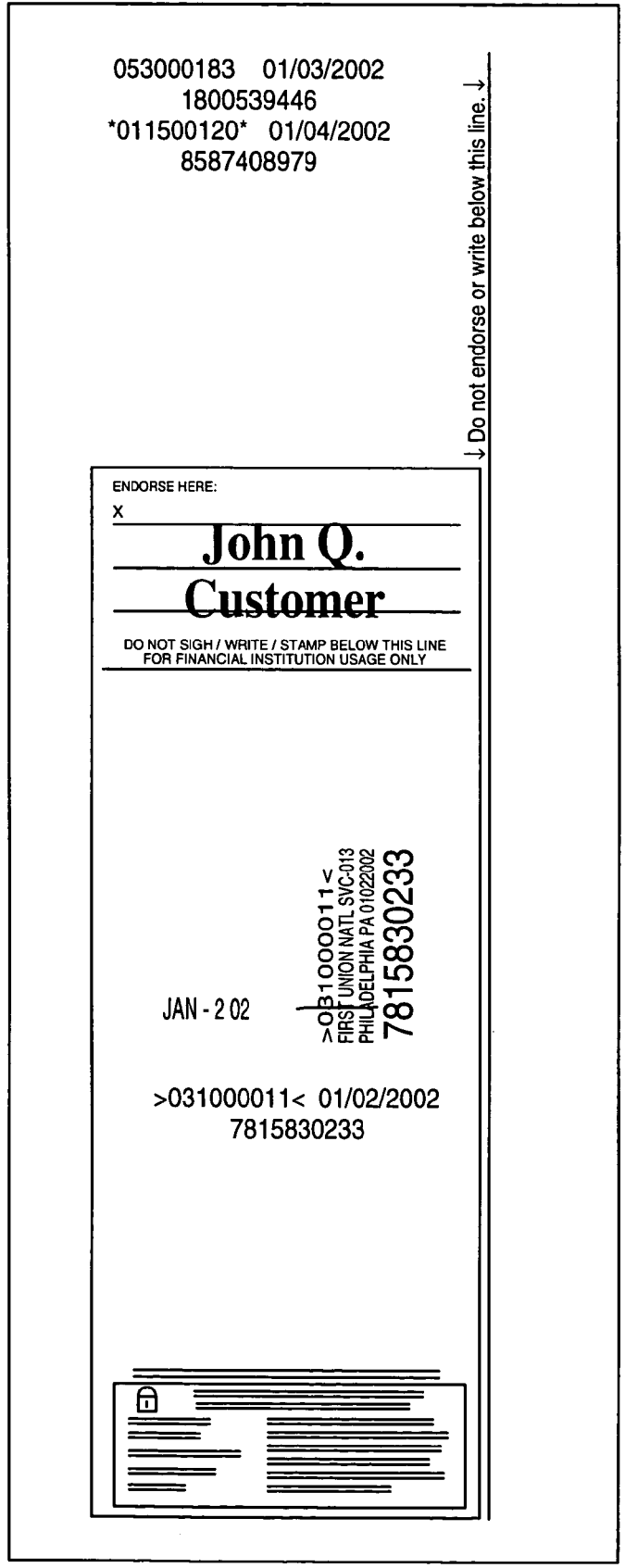
FIG. 5 is an illustration of the back side of the original IRD of FIG. 4.

Referring to FIGS. 4 and 5, the front side (FIG. 4) of another original IRD 50 and the back side (FIG. 5) of this original IRD are illustrated. The original IRD 50 shown in FIGS. 4 and 5 is similar to the original IRD 30 shown in FIGS. 2 and 3. For simplicity, only certain major differences between the original IRD 50 of FIGS. 4 and 5 the original IRD 30 of FIGS. 2 and 3 will be described.

The original IRD 50 of FIGS. 4 and 5 is a check of the business-type. The front side of the original IRD 50 includes an original scanned front image 57 of the check, and a MICR codeline 58 from the original encoded check, similar to those described hereinabove with reference to FIG. 2. The original IRD 50 of FIGS. 4 and 5 shows, by way of example, a returned check for the reason of not having sufficient funds in the associated checking account to cover the amount of the check. As such, the front side (FIG. 4) of the original IRD 50 of this check includes a return overlay 51 which is printed on top of the front image 57 of the check. The front side of the original IRD 50 also includes a text overlay 52 which identifies the check as being a returned check for having non-sufficient funds in the associated checking account to cover the amount of the check.

The front side of the original IRD 50 also includes a perforated strip 54 along the bottom portion of the original IRD as shown in FIG. 4. The construction of this perforated strip 54 is defined according to the ANSI X9.90 standard. The perforated strip 54 includes a MICR codeline 55 which is provided by the bank which is returning the check to the bank which sent the check. It should be noted that the MICR codeline 55 is different from the MICR codeline 58 which is from the original encoded check. For a returned check, the MICR codeline 55 in the perforated strip 54 is referred to as a "conditional qualified MICR codeline", as defined by the ANSI X9.90 standard. The conditional qualified MICR codeline 55 is printed with magnetic ink.

The front side of the original IRD 50 also includes an IRD identification 56 adjacent to the conditional qualified MICR codeline 55, in the position as shown in FIG. 4. The IRD identification 56 is similar to the EPC digit 37 which was described hereinabove with reference to FIG. 2, except the IRD identification 56 (in this case, the numeral "5") is used for identifying an IRD which relates to a returned check.

As shown in FIG. 5, the back side of the original IRD 50 is similar to the back side of the original IRD 30 shown in FIG. 3. The main difference is that the back side of the original IRD 50 (FIG. 5) shows a back image of a business check, and the back side of the original IRD 30 (FIG. 3) shows a back image of a personal check.

Figure 6:
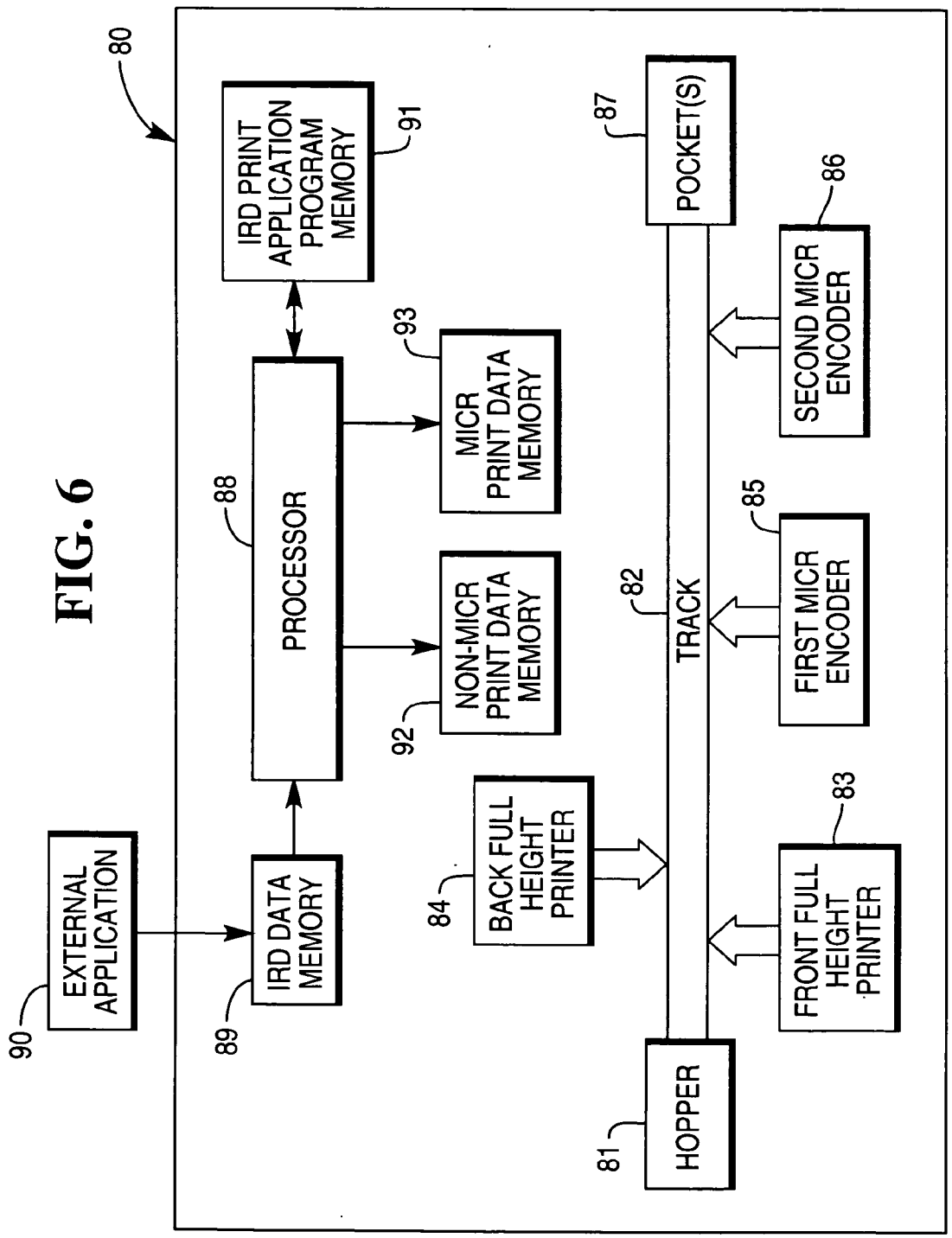
FIG. 6 is a schematic block representation of an apparatus constructed in accordance with the present invention.

Referring to FIG. 6, a schematic block representation of an apparatus 80 constructed in accordance with the present invention is illustrated. The apparatus 80 includes a document hopper 81 in which sheet material suitable for printing IRDs is stacked. The apparatus 80 also includes a document track 82 along which the sheet material in the document hopper 81 is transported from the document hopper to a number of pockets 87 located at the downstream end of the document track 82.

A front full height printer 83 is disposed along one side of the document track 82. The printer 83 may comprise a conventional type of ink jet printer which has been modified to print a multiple number of lines of alphanumeric text including graphics onto a front side of sheet material which is being transported along the document track 82 past the printer 83. The printer 83 uses an ink without any magnetic properties (referred to herein as "non-magnetic ink") to print the alphanumeric text including graphics onto the front side of the sheet material which is being transported along the document track 82.

A back full height printer 84 is disposed along an opposite side of the document track 82. The printer 84 may also comprise a conventional type of ink jet printer which has been modified to print a multiple number of lines of alphanumeric text including graphics onto the back side of the sheet material which is being transported along the document track 82 past the printer 84. The printer 84 also uses non-magnetic ink to print the alphanumeric text including graphics onto the back side of the sheet material which is being transported along the document track 82.

A first MICR encoder 85 is disposed along the same side of the document track 82 as the front full height printer 83. The first MICR encoder 85 is preferably of the type which prints a single MICR codeline onto the front side of the sheet material being transported along the document track 82. The first MICR encoder 85 uses magnetic ink to print a MICR codeline onto the front side of the sheet material which is being transported along the document track 82. The first MICR encoder 85 prints the MICR codeline at a location which is just above the bottom edge of the front side of the sheet material.

Similarly, a second MICR encoder 86 is disposed along the same side of the document track 82 as the front full height printer 83 and downstream from the first MICR encoder 85. The second MICR encoder 86 is also preferably of the type which prints a single MICR codeline onto the front side of the sheet material being transported along the document track 82. The second MICR encoder 85 also uses magnetic ink to print a MICR codeline onto the front side of the sheet material which is being transported along the document track 82. The second MICR encoder 86 prints the MICR codeline at a location which is above the location at which the first MICR encoder 85 prints its MICR codeline on the front side of the sheet material. Thus, the first MICR encoder 85 prints its MICR codeline at a location which is just above the bottom edge of the front side of the sheet material, and the second MICR encoder 86 prints its MICR codeline at a location which is further above the bottom edge of the front side of the sheet material. In this regard, the first MICR encoder 85 may be referred to as the low MICR encoder, and the second MICR encoder 86 may be referred to as the high MICR encoder.

The apparatus 80 further comprises a processor 88 for processing IRD data retrieved from a memory 89 which, in turn, receives the IRD data from an external application 90. The external application 90 may be any type of application in which an IRD is desired. The processor 88 processes the retrieved IRD data based upon an IRD print application program which is stored in memory 91. The IRD data is processed to provide non-MICR print files which are stored in memory 92 and MICR print files which are stored in memory 93. The generation of these print files is further described hereinbelow.

Figure 7A:
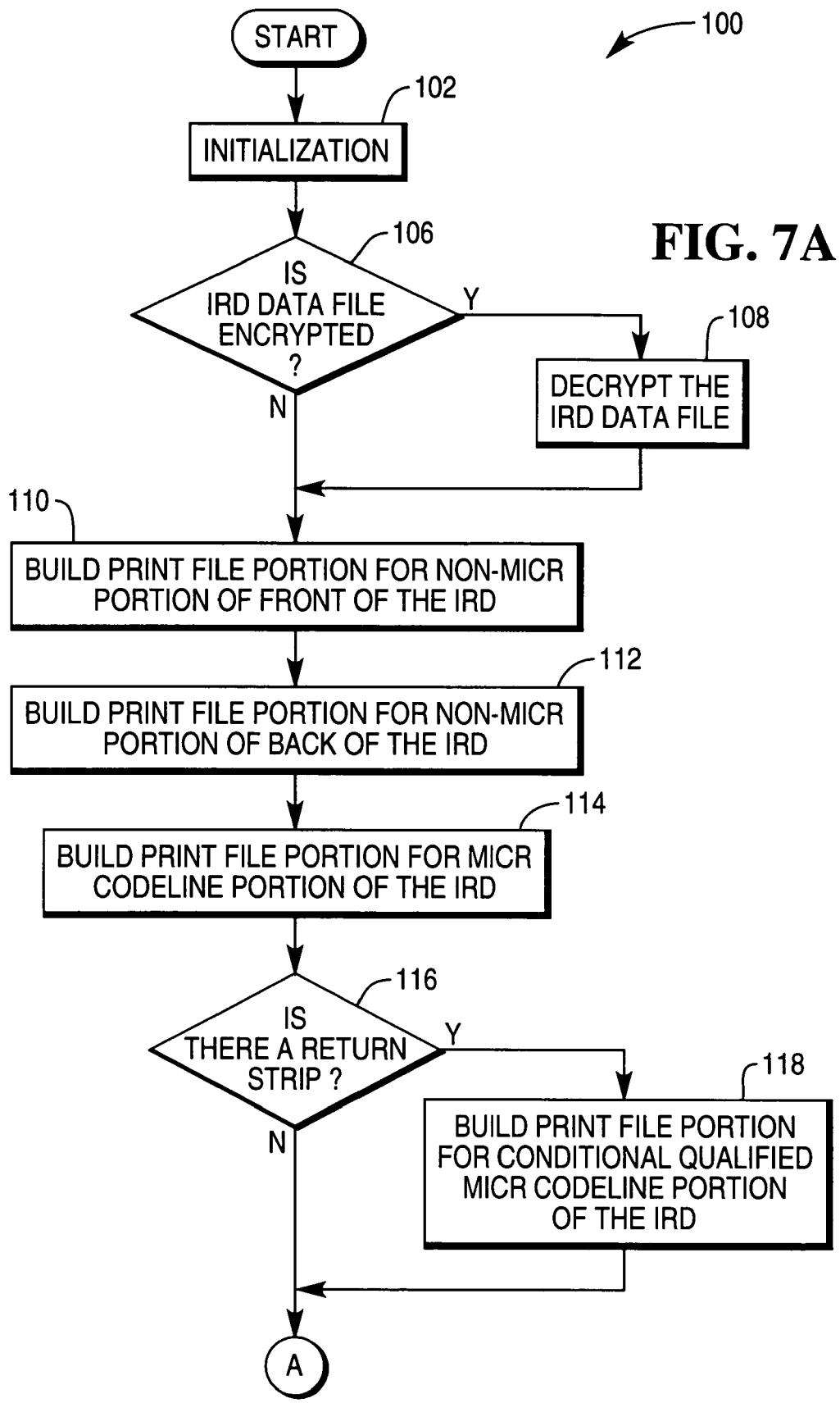
FIG. 7 is a flowchart depicting a program for creating an original IRD in accordance with the present invention.
Figure 7B:
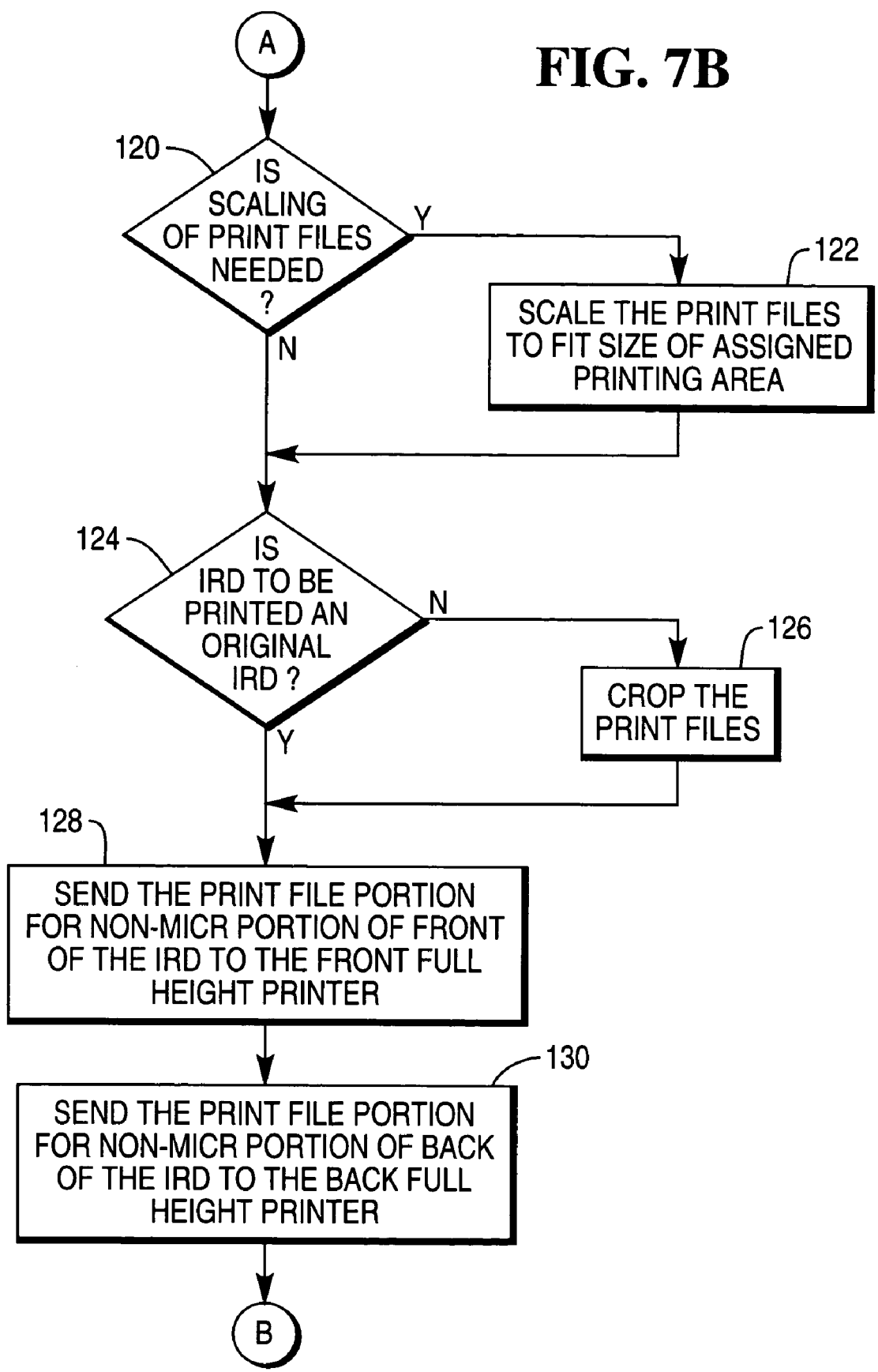

Referring to FIG. 7, a flowchart 100 depicts the IRD printing application program for creating an original IRD in accordance with the present invention. After program initialization in step 102, a determination is made in step 106 as to whether an IRD data file from the memory 89 is encrypted. If the determination in step 106 is negative, the program proceeds directly to step 110. However if the determination in step 106 is negative, the IRD data file is decrypted in step 108 before proceeding to step 110.

In step 110, a print file which is representative of the non-MICR portion of the front of the IRD to be printed (such as the non-MICR areas shown in FIGS. 2 and 4) is built. Similarly, in step 112 a print file which is representative of the non-MICR portion of the back of the IRD to be printed (such as the non-MICR areas shown in FIGS. 3 and 5) is built. In step 114, a print file which is representative of the MICR codeline portion of the front of the IRD to be printed (such as the MICR codeline 36 shown in FIG. 2 and the MICR codeline 58 shown in FIG. 4) is built.

The program proceeds to step 116 in which a determination is made as to whether there is a return strip (such as the return strip 54 shown in FIG. 4) associated with the IRD to be printed. If the determination in step 116 is affirmative, the program proceeds directly to step 120. However, if the determination in step 116 is negative, the program proceeds to step 118 to build a print file which is representative of a conditional qualified MICR codeline portion (such as the conditional qualified MICR codeline 55 shown in FIG. 4) of the front of the IRD to be printed. The program then proceeds to step 120.

In step 120, a determination is made as to whether any of the print files built in the previous steps need to be scaled. Scaling may be needed so that an assigned printing area, as defined by the ANSI X9.90 standard, can accommodate all of the print files built in the previous steps. For example, the front image 31 of the original IRD 30 shown is FIG. 2 is of a size which is different from the size of the front image 51 of the original IRD 50 shown in FIG. 4. If the determination in step 120 is negative, the program proceeds directly to step 124. However, if the determination in step 120 is affirmative, the program proceeds to step 122 to scale the print files built in previous steps to fit the size of the assigned printing area before proceeding to step 124.

In step 124, a determination is made as to whether the IRD to be printed is an original IRD. If the determination in step 124 is affirmative, the program proceeds directly to step 128. However, if the determination in step 124 is negative (i.e., the IRD to be printed is not an original IRD but is a substitute IRD), the program proceeds to step 126 to crop the print files built in the previous steps before proceeding to step 128. Print files are cropped to avoid further scaling of the print files. In step 128, the print file corresponding to the non-MICR portion of the front side of the IRD to be printed is sent to the front full height printer 83 shown in FIG. 6. Similarly, in step 130, the print file corresponding to the non-MICR portion of the back side of the IRD to be printed is sent to the back full height printer 84.

A determination then is made in step 132 as to whether there is a return strip associated with the IRD to be printed. If the determination in step 132 is negative, the program proceeds to step 134 to send to the first MICR encoder 85 the print file corresponding to the MICR codeline portion of the front side of the IRD to be printed before proceeding to step 140 to print the IRD. However, if the determination in step 132 is negative, the program proceeds to step 136 to send to the first MICR encoder 85 the print file corresponding to the conditional qualified MICR codeline portion of the front side of the IRD to be printed and to step 138 to send to the second MICR encoder 86 the print file corresponding to the MICR codeline portion of the front side of the IRD to be printed before proceeding to step 140 to print the IRD.

Although the above description describes using print files to create an IRD, it is conceivable that other data formats may be used to create an IRD. Also, although the above description describes IRD data as being received from the external application 90, it is contemplated that IRD data may be generated within the apparatus 80. It is also contemplated that some IRD data may be received from an external application and some IRD data be generated within the apparatus 80.

Further, although the above description describes a document hopper 81 (FIG. 6) for feeding sheet material on which information is printed to provide an IRD, it is contemplated that a manual, hand-drop type of feeder may be used instead. It is also contemplated that the manual, hand-drop type of feeder may be used in conjunction with the document hopper 81 so that each of the two feeders merges onto the document track 82.

Also, although the above description describes that the first MICR encoder 85 and the second MICR encoder 86 are separate from each other, it is conceivable that both of these encoders be integrated as a single unit which is capable of printing multiple MICR codelines.

Also, although the above description describes using the apparatus 80 to create an IRD having a return strip, as shown in FIGS. 4 and 5, it is conceivable that the return strip could instead be added later using a separate device. If this is the case, the apparatus 80 would be used to create only an IRD without a return strip.

A number of advantages result by printing an IRD in accordance with the present invention. One advantage is that mis-assignment of print data is avoided. Another advantage is that the IRD is printed (both the front and back sides and both the non-MICR and MICR portions) in a single pass of sheet material. This results in reduced labor cost because a human operator is not needed to ensure that the sheet material be run through another pass to complete creating the IRD. This also results in reduced material cost since non-MICR portions of the IRD are not printed using magnetic ink which is more expensive than non-magnetic ink.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of creating an image replacement document (IRD) during a single pass of sheet material through a printing apparatus, the method comprising:
   building a first print file portion based upon IRD data;
   building a second print file portion based upon IRD data;
   building a third print file portion based upon IRD data;
   encoding with magnetic ink onto the sheet material at least some information based upon the first print file portion to create a first front portion of the IRD during the single pass of the sheet material through the printing apparatus;
   printing with non-magnetic ink onto the sheet material at least some information based upon the second print file portion to create a second front portion of the IRD during the single pass of the sheet material through the printing apparatus; and
   printing with non-magnetic ink onto the sheet material at least some information based upon the third print file portion to create a rear portion of the IRD during the single pass of the sheet material through the printing apparatus.

2. A method according to claim 1, wherein the IRD data is received from an application external to the printing apparatus.

3. A method of creating an image replacement document (IRD) during a single pass of sheet material through a printing apparatus, the method comprising:
   building a print file based upon IRD data;
   encoding with magnetic ink onto sheet material at least some information based upon the print file to create a first front portion of the IRD during the single pass of the sheet material through the printing apparatus;
   encoding with magnetic ink onto sheet material at least some information based upon the print file to create a second front portion of the IRD which is above the first front portion of the IRD during the single pass of the sheet material through the printing apparatus;
   printing with non-magnetic ink onto the sheet material at least some information based upon the print file to create a third front portion of the IRD during the single pass of the sheet material through the printing apparatus; and
   printing with non-magnetic ink onto the sheet material at least some information based upon the print file to create a rear portion of the IRD during the single pass of the sheet material through the printing apparatus.

4. A method according to claim 3, wherein the IRD data is received from an application external to the printing apparatus.

* * * * *